Patented June 27, 1944

2,352,236

UNITED STATES PATENT OFFICE 2,352,236

TREATMENT OF HYDROCARBONS

Charles L. Thomas, Chicago, Ill., assignor to Universal Oil Products Company, Chicago, Ill., a corporation of Delaware No Drawing. Application March 31, 1941,
Serial No. 386,121

2 Claims. (Cl. 196—39)

This invention relates to a method for improving the characteristics of charging stocks for use in catalytic cracking process. More particularly, it relates to a hydrocarbon conversion process wherein a raw oil of poor cracking characteristics is treated by means of hydrogen halides or related reagents to improve the cracking characteristics.

In one specific embodiment the present invention comprises treating hydrocarbon oil with anhydrous hydrogen halides, preferably anhydrous hydrogen chloride, separating precipitated material, removing excess hydrogen chloride, and subjecting the treated product to cracking conditions of temperature and pressure in the presence of a suitable cracking catalyst.

During the course of investigation of catalytic cracking higher boiling hydrocarbon oils to produce valuable motor fuel products, it has been found that various charging stocks exhibit differing degrees of susceptibility to catalytic cracking and that these differing characteristics can not, in every case, be explained by the hydrocarbon composition where such composition is known. It is known, for example, that certain types of hydrocarbon are more readily cracked than others to produce lower boiling products. Thus, paraffins, olefins, and naphthenes are more readily cracked than are aromatic hydrocarbons. However, some charging stocks contain relatively minor quantities of materials, among which are nitrogen bases, which appear to act as catalyst poisons while other stocks of similar hydrocarbon composition are more susceptible to catalytic cracking.

The catalyst poisons contained in some of these oils are present in relatively small amounts of the order of 1% or less as a rule. In some instances these products may be removed by treatment with strong mineral acids or aqueous solutions of mineral acids but in so doing other reactive constituents which are not poisons to the catalyst are also removed and, as a consequence, there may be unnecessary losses of valuable charging stock, as well as increased acid requirements.

I have discovered that the desired improvement in crackability of the charging stock can be attained without the accompanying undesirable effects, namely, loss of product and removal of valuable charging stock, by treating the charging stock with an anhydrous hydrogen halide, and more particularly anhydrous hydrogen chloride.

Because of the relatively low consumption of reagent and because of the comparatively small amount of material removed from the charging stock the anhydrous hydrogen halides may be employed without unduly increasing the cost of the charging stock.

Any hydrocarbon oil which is suitable for catalytic cracking purposes but which is rendered less desirable because of the presence of minute amounts of catalyst poisons may be treated according to the present invention. This includes distillate fractions of hydrocarbon oil, particularly from petroleum sources; for example, naphtha, kerosene, gas-oil, and the like are particularly well suited to the process.

The cracking stock may be mixed with a low boiling paraffin hydrocarbon, for example liquid propane, butane, or pentane, since this facilitates precipitation and separation of the catalyst poisons which react with the anhydrous hydrogen halide. The oil may be mixed with the low boiling paraffin and then treated with the halide. An alternative is that the oil is treated with the halide and then the paraffin is added to assist in precipitation. (It should be pointed out that this feature differs from treating heavy oils to precipitate asphaltenes in that the distillates suitably used as catalytic cracking stocks contain little or no asphaltenes as produced.) The treated oil is recovered from the precipitated poisons and subjected to catalytic cracking. The amount of low boiling paraffin varies but is usually of the order of 1–3 volumes of liquid paraffin per volume of oil.

The exact nature of the catalytic poisons is not known although the sludge separated from the charging stock as the result of this process has been shown to contain nitrogen and it is probable that nitrogen bases are among the poisons removed, and I have found that the addition of nitrogen bases such as quinoline or other ring compounds having nitrogen in the ring decreases the cracking susceptibility of gas-oil, etc., when using composites of synthetic silica and other refractory oxides such as alumina, zirconia, thoria, magnesia, etc. The invention is not intended to be limited by any explanation of this character, however.

The usual procedure is to introduce the anhydrous hydrogen halide into the oil in sufficient quantity to produce a precipitate. Normally atmospheric temperature is used although moderately higher or lower temperatures may be employed. The temperature should not be sufficiently high to produce undue reaction with hydrocarbon constituents of the oil to cause hydrohalogenation, thereby introducing excessive amounts of chlorine into the charging stock. The quantity of anhydrous hydrogen halide required will vary considerably, and in some cases it will be desirable to increase the amount by introducing it under superatmospheric pressures but this only applies when a sufficient quantity can not be added at ordinary conditions of pressure and/or temperature.

After the hydrogen halide is added the oil is permitted to stand, for example, in a settling drum until the precipitated material has coagulated and settled to the bottom of the drum. After this the oil may be decanted, freed substantially completely of hydrogen halide, and used in the cracking step. The hydrogen halide is recovered as completely as possible from the oil, for example, by increasing the temperature and/or decreasing the pressure of the oil. It may then be absorbed in additional quantities of raw oil which is to be treated. If necessary the last remaining traces may be removed by chemical treatment such as water-washing or treatment with alkaline reagents including oxides, hydroxides, or carbonates of alkali- or alkaline-earth metals. In order to remove the precipitated sludge it is sometimes desirable to pass the oil through a filtering aid such as diatomaceous earth, kieselguhr, fuller's earth, etc. Hydrogen halide may be recovered from the separated precipitate by heating it until it is decomposed and the recovered anhydrous hydrogen halide reused in the process. The hydrogen halide is readily separated as a gas from condensable decomposition products. This is one of the advantages of the process since actual consumption of hydrogen halide is small, and recovery is relatively simple compared, for example, to sulfuric acid sludge recovery systems.

In the actual operation, which includes the catalytic cracking step, the treated charging stock may be subjected to cracking conditions of temperature and pressure in the presence of any suitable cracking catalyst including synthetic silica-alumina, silica-zirconia, silica-alumina-zirconia, etc. type catalysts which are prepared by separate or simultaneous precipitation of the constituents followed by washing, drying, and calcining to produce an active composite which is substantially free of alkali metal compounds. Such composites may be admixed with relatively inert materials including kaolin, silica, etc. Also useful in the process are naturally occurring earths which may or may not have been treated with chemicals such as acids to activate them.

The charging stocks treated according to the present invention are particularly susceptible to catalytic cracking with the above-mentioned catalytic composites but other catalysts, including metal halides such as aluminum chloride, may also be employed. The various catalytic masses are not, however, equivalent in their action and the cracking conditions used vary widely. When conducting the cracking operation, the charging stock is preferably treated with hydrogen halide according to this invention, while the recycle oil from the catalytic cracking step may be returned directly to the cracking step.

As an alternative within the scope of the invention, the recycle together with the charge may be treated. In some relatively rare instances, only the recycle oil is treated. The circumstances under which these various alternatives may be used are determined by the behavior of individual charging stocks and cannot be predicted for every oil.

It should be borne in mind that the purpose of this invention is to improve charging stocks, the use of which is otherwise difficult or unprofitable and not to those oils which are entirely or substantially free of catalyst poisons. Thus gas oils from Pennsylvania crude oil may require no treatment while gas oils from Trinidad, California, and Mexican crudes, to name a few, are greatly improved by this process.

The following example illustrates the usefulness and operability of the process but should not be construed as unduly limiting the invention:

A gas oil from California crude oil, when cracked at 930° F. and substantially atmospheric pressure at a liquid hourly space velocity of 4, yielded 11.7% of 400° F. end point gasoline in a six-hour processing period on a once-through operation. In addition 1.9% of gas containing approximately 50% of polymerizable olefins was produced.

The above oil was treated with anhydrous hydrogen chloride at about 75° F. and atmospheric pressure, allowed to stand, and separated from the solid precipitate which formed. It was thereafter freed of hydrogen chloride by first warming the oil to 125° F. and then washing it with 5% by volume of 5% sodium hydroxide solution. The gasoline yield under the same conditions above described was 18% by volume, and in addition 3.2% of gas containing approximately 60% of polymerizable olefin was formed. Thus, the yield of gasoline, including that producible by polymerizing the olefins, was about 19.7% while the total potential yield produced without the treatment of this invention was 12.6%. These tests are all based on a once-through operation but they clearly indicate the operability and advantages of the process. Thus by increasing the yield per pass, the capacity of the cracking unit is materially improved. Furthermore, a reduction of about 25–30% in catalyst deposit was realized, thus reducing reactivating requirements. As a result of this a substantial reduction in operating costs per gallon of gasoline occurred.

I claim as my invention:

1. A process for the conversion of hydrocarbon oils containing nitrogenous catalyst poisons which comprises treating the oil with anhydrous hydrogen chloride to precipitate catalyst poisons, separating the resultant precipitate from the oil, and subjecting the latter to catalytic cracking in the presence of a siliceous cracking catalyst.

2. The process as defined in claim 1 further characterized in that said treatment is effected in the presence of a low boiling paraffin to facilitate precipitation of the catalyst poisons.

CHARLES L. THOMAS.